United States Patent
Adams

[15] 3,675,420
[45] July 11, 1972

[54] VALVE ACTUATOR
[72] Inventor: Ladd M. Adams, Norman, Okla.
[73] Assignee: Balon Corporation, Okla. City, Okla.
[22] Filed: Oct. 7, 1970
[21] Appl. No.: 78,816

[52] U.S. Cl............................60/51, 60/52 CD, 60/52 US
[51] Int. Cl........................................................F15b 1/02
[58] Field of Search.............................60/51, 52 US, 52 CD

[56] References Cited

UNITED STATES PATENTS

| | | | |
|---|---|---|---|
| 2,579,116 | 12/1951 | Hirvonen | 60/51 |
| 2,673,527 | 3/1954 | Ashton et al. | 60/51 UX |
| 2,679,854 | 6/1954 | Stevenson | 60/51 X |
| 2,746,251 | 5/1956 | Ashton | 60/51 |
| 2,944,400 | 7/1960 | Ashton | 60/51 X |
| 2,984,985 | 5/1961 | MacMillin | 60/52 HE |
| 3,435,614 | 4/1969 | Ledeen et al. | 60/52 CD |

*Primary Examiner*—Edgar W. Geoghegan
*Attorney*—Dunlap, Laney, Hessin & Dougherty

[57] ABSTRACT

A valve actuator utilizing a power fluid and a biasing fluid for the opening and closing of a valve member of a valve assembly, wherein a portion of the power fluid is retained in an accumulator assembly which is adapted to utilize the biasing fluid to move the power fluid to a valve member actuator to either open or close the valve member upon actuation of the valve actuator in such a manner that the valve assembly fail-safe in an opened or closed position.

20 Claims, 4 Drawing Figures

INVENTOR
LADD M. ADAMS

BY
Dunlap, Laney, Hessin & Dougherty
ATTORNEYS

VALVE ACTUATOR

BACKGROUND OF THE INVENTION

1. Field of the Invention

This invention relates generally to improvements in valve actuators, and more particularly, but not by way of limitation, to a valve actuator utilizing a power fluid and a biasing fluid to open and close the valve member of a valve assembly.

2. Description of the Prior Art

In the past there have been many systems utilizing a power fluid to control various mechanical elements, and various types of valve actuators generally adapted to open or close the valve member of a valve assembly. One general type of valve actuator utilized in the past had a diaphragm element adapted to control the opening and the closing of the valve member. In this type of valve actuator, a differential pressure was applied across the control diaphragm, such that various mechanical linking elements were actuated to open or close a particular valve member. Although this type of valve actuator was generally adequate in some situations, the control diaphragm was generally constructed of a flexible resilient material, and was therefore subject to failure after a certain period of time, notwithstanding the frequency of the use thereof.

There have also been various valve actuators which utilized a power fluid to provide the impetus to move the valve member to an open or closed position. This type of valve actuator was useful in many applications, but generally was constructed of a large number of intercooperating parts, and generally functioned in such a manner that the power fluid was pumped directly from a power fluid reservoir to a valve member actuator. Thus, upon failure of the power fluid pump or the pump actuator, the valve member could not generally be opened or closed by the valve member actuator. It is apparent from the foregoing that the failing position of the valve member arbitrarily depended upon the position of the valve member when the power fluid pump or the pump actuator failed.

SUMMARY OF THE INVENTION

An object of the invention is to provide a valve actuator which will fail-safe in a predetermined position of the valve member of a valve assembly.

Another object of the invention is to provide a valve actuator having a relatively non-pulsating actuating movement.

One further object of the invention is to provide a valve actuator which will operate in a more efficient manner.

A still further object of the invention is to provide a valve actuator which is economical in construction and operation and will have a relatively long service life.

Other objects and advantages of the invention will be evident from the following detailed description when read in conjunction with the accompanying drawings which illustrate one embodiment of the invention.

DESCRIPTION OF THE PREFERRED EMBODIMENT

Figure 1:
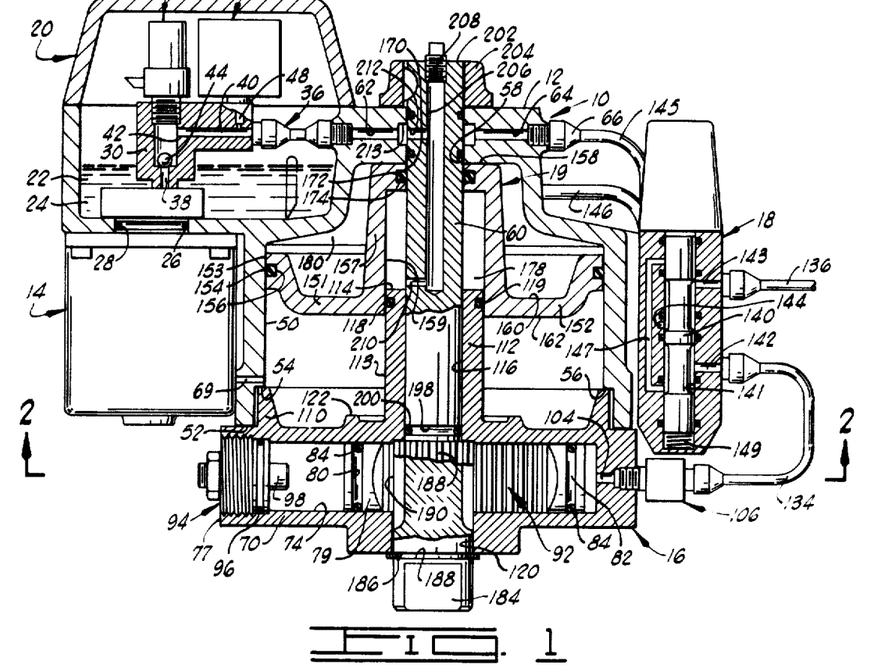
FIG. 1 is a sectional view of a valve actuator, showing the accumulator in a non-actuated position.
Figure 2:
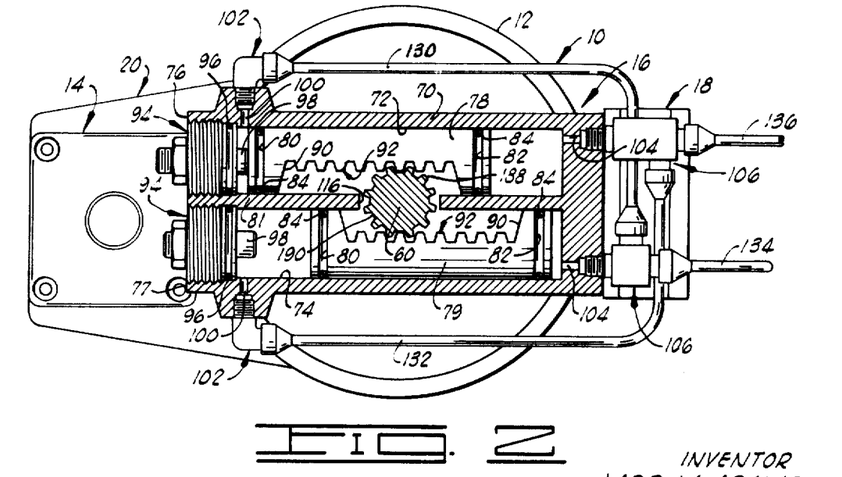
FIG. 2 is a sectional view of the valve actuator of FIG. 1, taken substantially along the lines 2—2 of FIG. 1.

Referring to the drawings in general, and to FIGS. 1 and 2 in particular, shown therein and designated by general reference character 10 is a valve actuator basically comprising: an actuator housing 12, having a pump and motor assembly 14 and a valve member actuator assembly 16 secured thereto; a solenoid control valve 18 supported thereon, and an accumulator assembly 19. The valve actuator 10 is adapted to control the position of a valve member in a valve assembly (not shown), that is to open and close the valve member in response to a predetermined actuating signal, as will be more fully described below.

As shown more clearly in FIG. 1, a portion 20 of the actuator housing 12 is shaped to provide a reservoir space 22. The reservoir space 22 is sized to retain a predetermined amount of power fluid 24, which is utilized to actuate the valve member actuator 16, in a manner to be more fully described below. An upper portion of the portion 20 of the actuator housing 12, in one form, may be constructed such that it is removably secured to the actuator housing 12. The basic purpose of this type of construction, as indicated in FIG. 1, is to facilitate the manufacture of the valve actuator 10 and to provide ready access to the various components housed in the portion 20 of the actuator housing 12 for the field repair or replacement thereof.

The pump and motor assembly 14 is secured to the portion 20 of the actuator housing 12, and a portion thereof is disposed in the reservoir space 22 via an aperture 26 which extends through the portion 20 of the actuator housing 12. More particularly, the suction side (not shown in detail) of the pump portion of the pump and motor assembly 14 is in communication with a portion of the power fluid 24 in the reservoir space 22. An O-ring 28 provides a sealing engagement between a portion of the pump and motor assembly 14 and the actuator housing 12, thereby preventing a leakage of the power fluid 24 from the reservoir space 22.

The pump and motor assembly 14 comprises a fluid pump which is driven by a motor. The motor may be electrically powered or, for example, in some installations, it may be desirable to utilize a gas or fluid driven type of motor due to the unavailability of electrical power. The particular size and the type of pump which may be utilized in the pump and motor assembly 14 will depend, to some extent, on the size of the particular valve actuator 10, the type of fluid being utilized as the power fluid, and the desired pressure to which the pump will be required to elevate the power fluid. The selection and sizing of the pump and motor assembly is well known in the art, and no further description is required herein.

In the particular embodiment of the invention, as shown more clearly in FIG. 1, the portion 20 of the actuator housing 12 is also sized to accommodate an L-shaped elbow 30, a relief valve 32, a pressure switch 34, and a coupling 36. As shown in FIG. 1, the elbow 30 has an inlet aperture 38 and an outlet aperture 40, each extending a distance therethrough. One end of the inlet aperture 38 is in communication with the discharge end of the pump, and one end of the outlet aperture 40 is in communication with the coupling 36.

The inlet aperture 38 and the outlet aperture 40 are each in communication with a central bore 42, which extends a distance into the elbow 30. The bore 42 has a larger diameter than the inlet aperture 38 or the outlet aperture 40, and the bore 42 is sized to accommodate a ball 44 disposed adjacent the intersection of the inlet opening 38 with the bone 42. The ball 44 is sized to encompass the inlet aperture 38, in one position thereof, and functions in the nature of a ball check valve, as will be described more fully below.

The relief valve 32 is disposed in one end of the bore 42, and is threadedly secured therein. The relief valve 32 is therefore in communication with the bore 42, and functions to provide pressure protection for the pump, as well as thermal expansion protection when the pump stops.

The pressure switch 34 is secured to the elbow 30 and is in communication with the outlet aperture 40 thereof via an orifice 48, which extends through a portion of the elbow 30. The orifice 48 is provided and sized to prevent premature actuation of the pressure switch 34 upon small surges in the pressure level of the power fluid passing through the outlet opening 40, during the operation of the valve actuator 10, as will be described more fully below.

It might also be noted at this point that, in an alternate form, a level controller could be incorporated within the portion 20 as an additional safety precaution. The level controller would function to sense the level of the power fluid 24 in the reservoir space 22, and to actuate appropriate control devices when a predetermined low level of power fluid is sensed. The incorporation of such a level controller, the additional control devices and the interconnection therebetween are well known in the art.

As shown in FIG. 1, the actuator housing 12 also includes a piston bore 50 formed therein, intersecting one end thereof, thereby forming an open end 52 of the actuator housing 12. A counterbore 54 is formed in the open end 52, thereby providing a surface 56, which generally faces in the same direction as the open end 52 of the actuator housing 12, for reasons to be made more apparent below.

A bore 58 extends through an upper portion of the actuator housing 12, intersecting the piston bore 50 thereof. The bore 58 is sized to journally receive a portion of an actuator stem 60 which extends therethrough.

A pair of openings 62 and 64 extend through an upper portion of the actuator housing 12, and one end of each opening 62 and 64 intersects the bore 58 through the actuator housing 12. The end of the opening 62, opposite the end which intersects the bore 58, is adapted to threadedly receive one end of the coupling 36, thereby placing the opening 62 in communication with the outlet aperture 40 of the elbow 30 via the coupling 36. The end of the opening 64, opposite the end thereof which intersects the bore 58, is adapted to threadedly receive one end of a coupling 66. The purpose and function of the openings 62 and 64 will be made more apparent below.

A vent opening 69 is formed through the actuator housing 12, generally near the open end 52 thereof. One end of the vent opening 69 intersects a portion of the actuator housing 12 formed by the piston bore 50, generally above the wall formed by the counterbore 54. The vent opening 69 is disposed to allow air trapped in the piston bore 50 to escape when the valve actuator 10 is actuated, for reasons which will become more apparent below.

The valve member actuator assembly 16 is secured to the actuator housing 12 generally adjacent the open end 52 thereof. The valve member actuator assembly 16 basically comprises a valve member actuator housing 70, having a pair of cylindrically shaped chambers 72 and 74, each extending a distance therethrough and intersecting one end of the valve member actuator housing 70, thereby forming what may be referred to as an open end 76 or 77 of the chamber 72 or 74, respectively. As shown more clearly in FIG. 2, the chambers 72 and 74 are spaced apart and separated by a separating wall 81, in the valve member actuator housing 70.

Each chamber 72 and 74 is sized to slidingly receive a piston 78 or 79, respectively. Each piston 78 and 79 has a pair of grooves 80 and 82 formed therein, each groove 80 or 82 being disposed generally adjacent one end of the respective piston 78 or 79. An O-ring seal member 84 is disposed in each of the grooves 80 and 82. Each O-ring 84 is sized to sealingly engage an adjacent portion of the wall formed by the chamber 72 or 74, thereby providing a fluid tight seal therebetween. The grooves 80 and 82 and the O-rings 84 are sized and shaped to maintain a sealing integrity between each piston 78 and 79 and the valve member actuator housing 70, as each piston 78 and 79 is reciprocated or slidingly moved in the respective chamber 72 or 74, for reasons to be more fully described below.

A notched portion 90 is formed in a portion of each piston 78 and 79, and a plurality of gear teeth 92 are formed in a portion of each notch 90. The pistons 78 and 79 are disposed in the respective chambers 72 and 74 such that the notched portions 90, or more particularly, the gear teeth 92 generally face the separating wall 81 between each of the chambers 72 and 74.

A portion of each chamber 72 and 74 is adapted to threadedly receive a plug 94, which is secured therein. Each plug 94 has an O-ring 96 disposed about a portion thereof, and each O-ring 96 is sized and adapted to form a fluid tight seal between each plug 94 and the respective chamber 72 or 74. Each plug 94 also has a stop 98 formed on one end thereof, for reasons to be made more apparent below.

A pair of apertures 100 are formed in the valve member actuator housing 70, each aperture 100 being disposed generally near one of the open ends 76 or 77. One aperture 100 is in communication with the chamber 72 and the other aperture 100 is in communication with the chamber 74. One end of each aperture 100 is adapted to threadedly receive an elbow-fitting 102, which is secured therein, as shown more clearly in FIG. 2.

A pair of apertures 104 are formed in the valve member actuator housing 70, each aperture 104 being disposed in one of the ends of the valve member actuator housing 70 opposite the open end 76 or 77 thereof. One aperture 104 is in communication with the chamber 72 and the other aperture 104 is in communication with the chamber 74. One end of each aperture 104 is adapted to threadedly receive a T-shaped fitting 106 which is secured therein, as shown more clearly in FIG. 2.

As shown more clearly in FIG. 1, the valve member actuator housing 70 has a flange portion 110 formed about an upper portion thereof. The flange 110 is shaped and disposed such that in the assembled position, the flange 110 is disposed in the counterbore 54 of the actuator housing 12 to a position wherein one end of the flange portion 110 abuts the surface 56. The flange portion 110 thereby cooperates with the actuator housing 12 to locate the valve member actuator assembly 16 in the actuator housing 12.

In the assembled position, the valve member actuator assembly 16 is secured to the actuator housing 12 in a suitable manner, such as by bolting thereto. It should also be noted that, in practice, it may be desirable to include an elastomeric seal member (not shown) disposed and shaped to form a fluid tight seal between the actuator housing 12 and the valve member actuator assembly 16.

A guide member 112 is formed on a central portion of the upper end of the valve member actuator housing 70, having an outer surface 113 and extending generally perpendicularly therefrom, terminating with an end 114. A bore 116 is formed through a central portion of the guide member 112 intersecting the end 114 thereof. The bore 116 also intersects a portion of each chamber 72 and 74, and a portion of the separating wall 81, as shown more clearly in FIG. 2. The bore 116 is sized to journally receive a portion of the actuator stem 60. An elastomeric O-ring seal member 118 is disposed in a groove 119 formed in a portion of the outer surface 113 of the guide member 112 generally adjacent the end 114 thereof, for reasons made more apparent below. It should also be noted, that in one form, the seal member 118 can be bonded in the groove 119. This may be particularly desirable since the seal member 118 is in sliding and sealing contact with a portion of an accumulator piston, as will be described below.

As shown more clearly in FIG. 1, an aperture 120 is formed through the lower end of the valve member actuator housing 70, and is shaped and disposed to intersect a portion of each chamber 72 and 74 therein. The aperture 120 is generally aligned with the bore 116 in the valve member actuator housing 70, and has a larger diameter than the bore 116. The aperture 120 is sized to receive a portion of the actuator stem 60.

A seating surface 122 is formed about an upper portion of the valve member actuator housing 70, generally about the guide member 112. The seating surface 122 is sized and disposed to engage a portion of an accumulator piston when the accumulator piston is moved to an actuated position, as will be more fully described below. It is apparent from the foregoing and will be made more apparent below that the seating surface 122 cooperates with the guide member 112 in the operation of the accumulator assembly 19.

As shown more clearly in FIG. 2, each elbow 102 is interconnected to one of the T-shaped fittings 106 by a conduit 130 or 132. More particularly, the elbow 102 in communication with the chamber 72 is interconnected to the T-shaped fitting 106 which is in communication with the chamber 74, and the elbow 102 which is in communication with the chamber 74 is interconnected to the T-shaped fitting 106 which is in communication with the chamber 72. Each T-shaped fitting 106 is interconnected to the solenoid control valve 18 via a conduit 134 or 136.

The control valve 18 is of the type referred to in the art as a four-way, solenoid control valve, and basically includes, a valve member 140 reciprocatingly disposed in a valve chamber 141. The valve member 140 has a plurality of grooves formed therein, and a plurality of seal members are disposed in the valve chamber 141, as indicated in FIG. 1. The grooves and the seal members are adapted and disposed such that the flow of fluid through the control valve 18 is altered by reciprocating the valve member 140 in the valve chamber 141.

The conduit 134 is in communication with the valve chamber 141 via an outlet opening 142 in the control valve 18, and the conduit 136 is in communication with the valve chamber 141 via an outlet opening 143 in the control valve 18. The control valve 18 has an inlet opening 144 (partially shown in cross-section in FIG. 1) which is in communication with the valve chamber 141 and a conduit 145 (partially shown in FIGS. 1 and 4) is connected to the inlet opening 144.

The conduit 145 is also connected to the opening 64 in the actuator housing 12 via the coupling 66, thereby placing the valve chamber 141 in communication with an accumulator space, in one position of the valve actuator 10, as will be made more apparent below.

Figure 4:
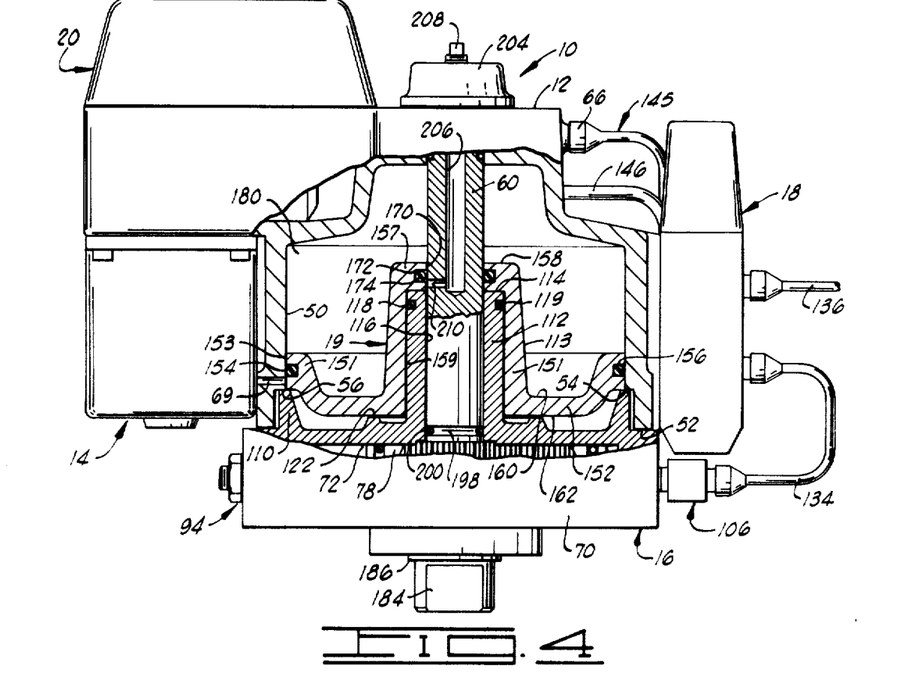
FIG. 4 is a partial sectional view of the valve actuator of FIG. 1, but showing the accumulator assembly in an actuated position.

The solenoid control valve 18 also includes a drain opening (not shown) which is in communication with the reservoir space 22 via a conduit 146 (partially shown in FIGS. 1 and 4). A common exhaust opening 147 is formed in the solenoid valve 18, and is disposed therein to provide communication between the outlet opening 142 or the outlet opening 143 and the drain opening (not shown) via the valve chamber 141, in alternate positions of the valve member 140, as will be made more apparent below.

The inlet opening 144 of the control valve 18 communicates with the outlet openings 142 and 143 via the valve chamber 141 in the control valve 18. The control valve 18 is particularly adapted such that the inlet opening 144 is alternately placed in communication with the outlet opening 142 or 143 depending upon the position of the valve member 140 in the valve chamber 141, as will be made more apparent below.

When the valve member 140 is in the position as shown in FIG. 1, the grooves in the valve member 140 and the seal members in the control valve 18 cooperate in such a manner that the inlet opening 144 is in communication with the outlet opening 143. In this position, the outlet opening 142 in in communication with the reservoir space 22 via the drain opening of the control valve 18 and the conduit 146. For the purpose of reference, the position of the control valve 18, described above will sometimes be referred to below as the energized position thereof. The energized position of the solenoid control valve 18 is diagrammatically illustrated in FIG. 3 and designated therein by the reference numeral 148.

When the control valve 18 is deenergized, the valve member 140 is moved in the valve chamber 141 by a return spring 149 such that the grooves in the valve member 140 and the seal members in the control valve 18 cooperate in such a manner that the inlet opening 144 is in communication with the outlet opening 142. In this position the outlet opening 143 is in communication with the reservoir space 22 via the drain opening of the control valve 18 and the conduit 146. The deenergized position of the solenoid control valve 18, described above, is diagrammatically illustrated in FIG. 3, and designated therein by the reference numeral 150.

It will be apparent to those skilled in the art from the foregoing, that the solenoid control valve 18 is adapted to direct fluid from the inlet 144 into either discharge or outlet opening 142 or 143 depending on the position of the valve member 140. In other words, the control valve 18 is adapted to be moved to an opening or closing position with reference to the valve member actuator 16 upon actuation thereof, thereby opening or closing the valve member of a valve assembly, as will become more apparent below.

Figure 3:
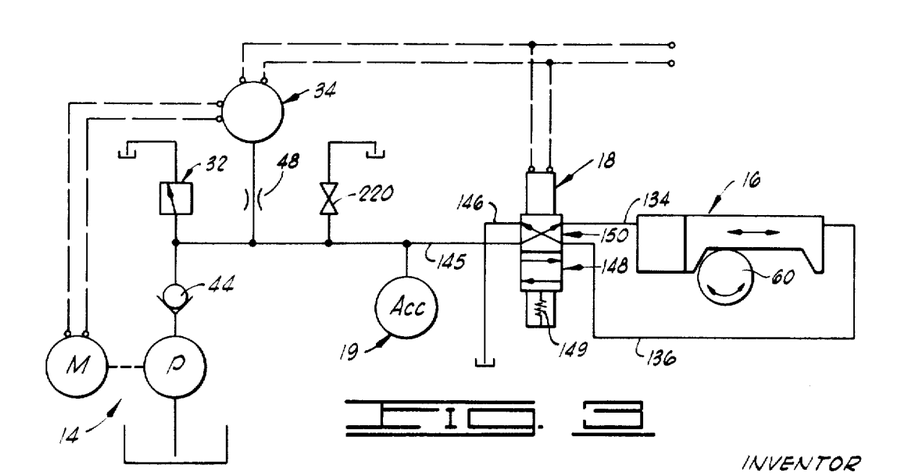
FIG. 3 is a functional, schematic view of the valve actuator of FIG. 1.

The control valve 18, as indicated in FIG. 4, is electrically actuated. However, various types of electrically operated and pneumatically operated control valves are available which are adapted to perform the function generally described above with respect to the control valve 18. These various types of control valves and the sizing and selection thereof are well known in the art. The control valve 18 has been described herein as an electrically operated solenoid-type control valve merely for the purpose of maintaining a uniformity with respect to the overall control functions associated with the valve actuator 10. When considering the various control functions as described above, and as will be more particularly described below, one skilled in the art may easily substitute pneumatically operated equivalents in lieu of most of the electrically operated control components, as shown in FIG. 3.

As shown more clearly in FIG. 1, an accumulator piston 151, having a base 152 and an outer edge 153, is disposed in the piston bore 50 of the actuator housing 12. The accumulator piston 151 is shaped such that the outer edge 153 thereof slidingly mates with the wall formed by the piston bore 50 in the actuator housing 12.

An elastomeric seal member 154 is disposed in a groove 156, which is formed in a portion of the outer edge 152. The seal member 154 is shaped to provide a fluid tight seal between the accumulator piston 151 and the actuator housing 12, for reasons which will be made more apparent below.

A central portion 157 of the accumulator piston 151 is shaped to communicate with the guide member 112, and extends generally perpendicularly from the base 152 of the accumulator piston 151. The portion 157 is generally cup-shaped and has a closed end 158. A hollow portion 159 is formed in the central portion 157 and extends a distance therethrough, intersecting the base 152 of the accumulator piston 151. In a preferred form, the hollow portion 159 is cylindrically shaped. The walls formed by the hollow portion 159 of the accumulator piston 151 are sized to slidingly mate with the outer surface 113 of the guide member 112. In other words, the outer surface 113 is sized to slidingly extend a distance into the hollow portion 159 of the piston 151. As shown more clearly in FIGS. 1 and 4, the base 152 has an upper surface 160 and a lower surface 162.

An aperture 170 extends through the closed end 158 of the accumulator piston 151, and is sized to journally receive a portion of the stem actuator 60, as shown in FIGS. 1 and 4. A groove 172 is formed in a portion of the wall formed by the aperture 170, and an elastomeric seal member 174 is disposed in the groove 172. The elastomeric seal member 174 is shaped and disposed to form a fluid tight seal between the accumulator piston 151 and the adjacent portion of the stem actuator 60, thereby providing what may be referred to as a sealingly closed end 158 of the accumulator piston 151. The sealingly closed end 158 of the piston 151 is sized and disposed to contact a portion of the power fluid in an accumulator space such that when the piston 151 is actuated or moved to an actuated position, a portion of the power fluid is moved from an accumulator space, as will be made more apparent below.

As shown more clearly in FIG. 1, the central or raised portion 157 of the accumulator piston 151 is shaped to cooperate with the guide member 112 such that the end 114 of the guide member 112 cooperates with the hollow portion 159 and the sealingly closed end 158 of the accumulator piston 151 to define an accumulator space 178 therebetween. As shown in FIG. 1, the closed end 158 of the accumulator piston 151 is disposed adjacent the accumulator housing 12, and therefore, the accumulator piston 151 is in its uppermost, or non-actuated (charged) position. In the uppermost position of the accumulator piston 151, the volumetric space defined by accumulator space 178 is maximum. As shown in FIG. 4, the accumulator piston 151 has been moved to its lowermost or actuated discharged position, that is, a position wherein the lower surface 162 of the base 152 is disposed adjacent and supported by the seating surface 122 of the valve member actuator assembly 16. In this lowermost position of the accumulator piston 151, the volumetric space defined by accumulator space 178 is minimum, or more particularly as shown in FIG. 4, the accumulator space 178 is negligible.

As shown more clearly in FIG. 1, the accumulator piston 151 is shaped and disposed to cooperate with the actuator housing 12 such that the upper surface 160 of the accumulator piston 151 cooperates with a portion of the actuator housing 12 formed by the piston bore 50 therein to define a biasing fluid space 180 therebetween. The biasing fluid space 180 is shaped to retain a predetermined amount of biasing fluid (gas). The particular biasing fluid to be utilized in the valve actuator 10 will depend to some extend on the particular type of application, and the actuator housing 12 is provided with a suitable inlet aperture (not shown) in communication with the biasing fluid space so that the biasing fluid may be pumped from an external source into the biasing fluid space 180. The biasing fluid space 180 is disposed and the biasing fluid per se is of a sufficient pressure to bias the actuator piston 151 generally toward an actuated position, that is a position wherein the lower surface 162 of the accumulator piston 151 is supported by the seating surface 122 of the valve member actuator 16.

It is apparent from the foregoing that the accumulator assembly 19 includes the accumulator piston 151 and the guide member 112. In one sense, it may also be stated that the accumulator assembly 19 includes that portion of the actuator housing 12 which cooperates with the accumulator piston 151 to define the biasing fluid space 180, and that portion of the seating surface 122 of the valve member actuator 16.

The actuator stem 60, as shown more clearly in FIG. 1, is shaped to journally extend through the bore 58 in the actuator housing 12, through the aperture 170 of the accumulator piston 151, through the bore 116 of the guide member 112, and through the aperture 120 of the valve member actuator assembly 16. A lowermost end portion 184 of the stem actuator 60 is sized and shaped to be interconnected with the valve member of a valve assembly (not shown), such that the valve member may be rotated to an open and a closed position in response to the rotation of the stem actuator 60.

A retaining ring 186 is disposed in a groove 188 which is formed about a portion of the stem actuator 60 generally adjacent the lowermost end portion 184 thereof. The retaining ring 186 is sized and disposed to engage the adjacent portion of the valve member actuator assembly 16, and to retain the upward movement of the stem actuator 60.

As shown more clearly in FIGS. 1 and 2, a plurality of gear teeth 188 are formed about a portion 190 of the stem actuator 60. The gear teeth 188 are sized and disposed on the stem actuator 60 to meshingly engage the gear teeth 92 of each piston 78 and 79, as shown more clearly in FIG. 2. The actuator stem 60 is shaped and disposed to cooperate with the pistons 78 and 79 such that as the pistons 78 and 79 move in opposite directions in their respective chambers 72 or 74, the meshing engagement between the gear teeth 188 of the stem actuator 60 and the gear teeth 92 of the pistons 78 and 79 causes the stem actuator 60 to be rotated in response thereto. Each piston 78 and 79 is thus in communication with the valve member of a valve assembly via the stem actuator 60 and the meshing engagement of the gear teeth 92 of the pistons 78 and 79 and the gear teeth 188 of the stem actuator 60, such that the valve member is opened or closed in response to the sliding movement of the pistons 78 and 79 in the respective chambers 72 or 74.

A groove 198 is formed in a portion of the stem actuator 60 generally above the gear teeth portion 190 thereof and an elastomeric seal member 200 is disposed in the groove 198. The elastomeric seal member 200 is shaped and disposed to provide a fluid tight seal between the stem actuator 60 and the valve member actuator housing 70 of the valve member actuator 16.

The stem actuator 60 is sized such that in the assembled position, as shown more clearly in FIG. 1, the stem actuator 60 extends a distance above the actuator housing 12 terminating with an uppermost end portion 202. A cap 204 is secured about the stem actuator 60 generally adjacent the uppermost end portion 202 thereof. The cap 204 is shaped to engage a portion of the actuator housing 12, thereby retaining the downward movement of the stem actuator 60 in the actuator housing 12. The cap 204 is removable and a portion of the stem actuator 60 generally adjacent the uppermost end portion 202 thereof is adapted such that the stem actuator 60 may be rotated utilizing a hand-tool secured about the stem actuator 60. The reason for adapting the stem actuator 60 such that it may be rotated manually utilizing a hand-tool will be made more apparent below.

An opening 206 extends axially through a portion of the stem actuator 60, intersecting the uppermost end 202 thereof. A threaded fitting 208 is sealingly secured in a portion of the opening 206 generally adjacent the uppermost end 202.

As shown more clearly in FIG. 1, an opening 210 extends transversely through a portion of the stem actuator 60, intersecting the outer periphery of the stem actuator 60 and a portion of the opening 206 therethrough. The opening 210 is disposed in the stem actuator 60 such that in the assembled position, as shown more clearly in FIGS. 1 and 4, the opening 210 intersects the outer periphery of the stem actuator 60 generally near the upper end 114 of the guide member 112 and such that the opening 210 provides the intercommunication between the accumulator space 178 and the opening 206 of the stem actuator 60.

It is apparent from the foregoing that the valve member actuator 16 is in communication with the accumulator space 178 via the conduits 134 and 136, the control valve 18, the opening 64 in the actuator housing 12, and the opening 206 in the stem actuator 60. The control valve 18 controls the flow of the power fluid from the accumulator space 178 to the valve member actuator 16, in a manner to be more fully described below.

It is also apparent from the foregoing that the reservoir space 22 is in communication with the accumulator space 178 via the elbow 30, the coupling 36, the opening 62 and the opening 206 in the stem actuator 60. The power fluid retained in the reservoir space 22 is thereby pumped to the accumulator space 178, in a manner to be more fully described below.

An opening 212 extends transversely through a portion of the stem actuator 60 intersecting the outer periphery thereof and a portion of the opening 206 therein. The opening 212 is disposed to provide the intercommunication between the opening 206 in the stem actuator 60 and an annular slot 213 in the actuator housing 12 generally about the bore 58 therein. The annular slot 213 is sized and disposed to provide an intercommunication between the openings 62 and 64 and the opening 206 in the stem actuator 60.

As shown in FIG. 3, a manually operated bleed valve 220 is interposed between the accumulator space 178 and the pressure switch 34. The bleed valve 220 is also connected to the reservoir space 22 in the actuator housing 12 and is disposed and adapted such that the power fluid retained in the accumulator space 178 and in the conduits between the accumulator space 178 and the ball check valve 44 may be drained into the reservoir 22, for reasons which will be made more apparent below.

As schematically shown in FIG. 3, the motor of the pump and motor assembly 14 is electrically connected to the pressure switch 34. The pressure switch 34 and the solenoid valve 18 are each electrically connected to a common power source (not shown).

OPERATION OF THE PREFERRED EMBODIMENT

For the purpose of initially describing the operation of the valve actuator 10, it will be assumed that the valve actuator 10, as shown in FIGS. 1 and 2, has been actuated such that the stem actuator 60 has moved the valve member of a valve assembly (not shown) to the open position. As shown in FIG. 1, the accumulator space 178 has been filled with power fluid and the valve member 140 of the solenoid control valve 18 has been positioned such that the accumulator space 178 in in fluidic communication with the valve member actuator 16 via the conduit 136. In other words, the solenoid control valve 18 is in the energized position 148.

In the energized position 148 of the solenoid control valve 18, the conduit 134 is in fluidic communication with the conduit 146, and thus in fluidic communication with the fluid reservoir 22. The pistons 78 and 79 are positioned in the respective chambers 72 and 74 generally as shown in FIG. 2.

The power fluid retained in the accumulator space 178 is prevented from back-flowing through the pump and into the fluid reservoir 22 by the ball check valve 44, which is interposed therebetween.

The biasing fluid retained in the biasing fluid space 180 biases the accumulator piston 151 generally toward an actuated position, as shown in FIG. 4; however, since each piston 78 and 79 has been moved to one end of the respective chamber 72 or 74, the power fluid is retained in the accumulator space 178.

When the solenoid control valve 18 is moved to the deenergized position 150, as shown in FIG. 3, the valve member 140 therein is moved to a position wherein the conduit 134 is in fluidic communication with the power fluid retained in the accumulator space 178 via the control valve 18 and the conduit 145. As indicated in FIG. 3, the conduit 136 will be in fluidic communication with the fluid reservoir 22 via the control valve 18 and the conduit 146, in the deenergized position 150 of the control valve 18.

It is apparent from the foregoing, that when the solenoid control valve 18 is in the deenergized position 150, described above, that the power fluid retained in the accumulator space 178 will be diverted to the opposite end of each chamber 72 and 74, with respect to the end of the chambers 72 and 74 in communication with the accumulator space 178 in the energized position 148 of the control valve 18, as shown in FIGS. 1 and 2. The power fluid will therefore bias each piston 78 and 79 to the opposite end of the respective chamber 72 or 74, with respect to the position of each piston 78 and 79 as shown in FIG. 2.

As the pistons 78 and 79 are moved by the power fluid, in a manner as indicated above, the gear teeth 92 of each piston 78 and 79 will meshingly engage the gear teeth 188 formed about the stem actuator 60, thereby rotating the stem actuator 60. The valve member will thus be moved to the closed position by the stem actuator 60.

The power fluid is moved from the accumulator space 178 by the accumulator piston 151. The biasing fluid retained in the baising fluid space 180 will force the accumulator piston 151 in a downward direction generally toward the actuated position thereof, the sealingly closed end 158 of the accumulator piston 151 thereby contacting and moving the power fluid from the accumulator space 178. As the accumulator piston 151 is being moved to the actuated position, as described above, any air or gas which has been trapped in the piston bore 50 generally between the accumulator piston 151 and the valve member actuator assembly 16 will be vented out the vent opening 69 in the actuator housing 12. At the completion of this cycle, most of the power fluid retained in the accumulator space 178 will be moved through the solenoid control valve 18 to the valve member actuator 16, and the accumulator piston 151 will be moved to the actuated position, as shown in FIG. 4.

When the power fluid is removed from the accumulator space 178, a pressure drop will occur in the openings and apertures interconnecting the accumulator space 178 with the pump and motor assembly 14 and, more particularly, a pressure drop will occur in the outlet opening 40 of the elbow 30. The pressure switch 34 is adapted to sense a pressure drop occurring in the outlet opening 50, and when the pressure of the power fluid retained therein reaches a predetermined low level, the pressure switch 34 is actuated.

The pressure switch 34 is electrically interconnected to the motor of the pump and motor assembly 14 in such a manner that when the pressure switch 34 is actuated, that is, senses the predetermined low pressure level of the power fluid in the outlet opening 40, the motor of the pump and motor assembly 14 will be started. The motor will, of course, drive the pump of the pump and motor assembly 14, thereby pumping the power fluid 24 from the power fluid reservoir 22 into the accumulator space 178 via the interconnecting openings and apertures therebetween.

As the pump supplies power fluid to the accumulator space 178, the accumulator piston 151 will be moved in an upwardly direction, generally toward a non-actuated position thereof against the biasing force of the biasing fluid retained in the biasing fluid space 180. As the power fluid is supplied to the accumulator space 178 in this manner, it is apparent that the pressure level of the power fluid in the apertures and openings interconnecting the accumulator space 178 with the pump of the pump and motor assembly 14 will increase. When the pressure level of the power fluid reaches a predetermined high level, the pressure switch 34 is deactuated, thereby disconnecting the motor of the pump and motor assembly 14 from the power supply, or in other words, stopping the motor. In a preferred form, the pressure switch 34 is set to deactuate or disconnect the motor when the accumulator piston 151 has been moved to the deactuated (charged) position, as shown in in FIG. 1, that is, a position wherein the closed end 158 of the accumulator piston 151 is generally adjacent the actuator housing 12.

The relief valve 32 is generally set to relieve at a pressure level slightly above the high level actuating pressure of the pressure switch 34, and functions to relieve the excess pressure, thereby protecting the pump and the other components in contact with the power fluid.

In actual practice, the solenoid control valve 18 is generally contacted to respond, or in other words to be energized or deenergized, to a predetermined set of conditions, for example, an upstream or downstream pressure level, and to divert the power fluid to the valve member actuator 16 to open or close the valve member of a valve assembly, in response thereto.

The temporary storage of the power fluid in the accumulator space 178 and the operation of the accumulator piston 151 to move the power fluid from the accumulator space 178 to the valve member actuator assembly 16, generally eliminates pulsations caused by the pumping of the power fluid directly from a fluid reservoir to a valve member actuator. The power fluid is thus non-pulsatingly supplied to the valve member actuator 16 by the valve actuator 10. The valve actuator 10 will therefore open and close a valve member at a virtually constant, uniform rate. This particular feature is important in some applications where the opening of a valve member in a pulsating manner may result in an excessive or destructive force being applied to the valve seats or the stem seals of the valve assembly, thereby resulting in a premature destruction of same. The uniformity in the supply of power fluid to the valve member actuator 16 will also result in a minimum wearing between the gear teeth 92 of each piston 78 and 79, and the meshing gear teeth 188 of the stem connector 60.

The valve actuator 10, as shown in FIGS. 1, 2 and 4, and as schematically shown in FIG. 3, also includes a fail-safe feature. In other words, the valve actuator 10 is constructed such that upon failure of the control power supply, the valve actuator 10 will move a valve member to a predetermined opened or a closed position, depending upon which position is more desirable in a particular application. Since in most applications it is desirable upon failure of the control power supply that the valve member of a valve assembly be moved to the closed position, the fail-safe feature of the valve actuator 10 has been described generally above and will be described below to accomplish this purpose, that is, to close the valve member upon failure of the control power supply.

Assuming that the valve member of a valve assembly has been moved to the open position by the valve actuator 10, as described above, a failure of control power, in other words, a general power failure in the system, will cause the solenoid control valve 18 to be deenergized. When the solenoid control valve 18 is in the deenergized position 150, the power fluid in the accumulator space 178 is diverted to the chambers 72 and 74, in a manner as described above, thereby closing the valve member of a valve assembly. The external control power, or in other words the pump and motor assembly 14, is not required to move the power fluid to the valve member actuator assembly 16, since this is accomplished by the biasing fluid moving the accumulator piston 151 to the actuated position, as shown in FIG. 4.

It should also be noted that, in some applications, it may be desirable to utilize stored springs to bias the accumulator piston 151 toward the actuated position thereof, in lieu of the pressurized biasing fluid described above. In this instance, the spring would be sized and disposed to biasingly engage the actuator housing 12 and the accumulator piston 151.

After the valve member of a valve assembly has been moved to the closed position or, as described above to the fail-safe position, by the valve actuator 10, and assuming a failure of the control power supply, the valve member of the valve assembly may then be opened by hand. This is accomplished in a manner as described before, utilizing a hand-tool secured about the upper end portion of the stem actuator 60 and manually rotating the stem actuator 60. The bleed valve 220, as shown in FIG. 3, is provided to facilitate the manual operation of the valve actuator 10, as described above. Prior to turning the stem actuator 60 by hand, it is desirable to open the valve 220 and bleed the power fluid retained in the openings and apertures interconnecting the accumulator space 178 with the pump of tee pump and motor assembly 14.

It is apparent from the foregoing that during the normal operation or during the fail-safe operation of the valve actuator 10 that the accumulator piston 151 will essentially function in the same manner. In other words, the power fluid retained in the accumulator space 178 will be moved therefrom by the accumulator piston 151 which is biased toward an actuated position by the biasing fluid.

It will be apparent to those skilled in the art from the foregoing, that the valve actuator 10 could easily be adapted to open the valve member of a valve assembly upon failure of the control power supply, or in other words fail-safe in the open position of the valve member of a valve assembly. If it were desirable for the valve actuator 10 to fail-safe in the open position of a valve member, the valve actuator 10 would function in the manner similar to that described above, the salient exception being that the control valve 18 would be adapted such that the reference numeral 148 in FIG. 3 would represent the deenergized position of the control valve 18 and the reference numeral 150 in FIG. 3 would represent the energized position of the control valve 18. It will also be apparent to those skilled in the art that the relative positions of the control valve 18, that is the energized position 148 and the deenergized position 150, could remain substantially as shown in FIG. 3 and as described above, by simply modifying the description of the valve member actuator 16.

The valve actuator 10 therefore provides a relatively constant, uniform movement of the valve member from an opened to a closed position utilizing a minimum number of moving or wearing parts. The valve actuator 10, as described above, is also constructed to fail-safe in either an opened or closed position as predetermined in a given application.

It will also be apparent from the foregoing that the guide member 112 could be constructed integrally with the actuator housing, or the guide member 112 and the cooperating seating surface 122 could be constructed as a separate component. One reason for constructing the guide member 112 and the seating surface 122 as an integral part of the valve member actuator 16 is to reduce the number of parts required and to simplify the interconnection and cooperation between the stem actuator 60, the valve member actuator 16 and the accumulator assembly 19.

Changes may be made in the construction and arrangement of the various elements as disclosed herein without departing from the spirit and scope of the invention as defined in the following claims.

What is claimed is:

1. A valve actuator utilizing a power fluid and a biasing fluid for opening and closing a valve member of a valve assembly, comprising:
   an actuator housing;
   an accumulator assembly supported by the actuator housing, comprising:
      a guide member means disposed in the actuator housing; and
      a piston means, having a portion thereof in communication with the guide member means such that the piston means can be moved from an actuated to a non-actuated position, a portion of the piston means being shaped to cooperate with a portion of the guide member means to define an accumulator space therebetween, the piston means being shaped such that when the piston means is disposed in the non-actuated position, the accumulator space retains a predetermined amount of power fluid, a portion of the piston means being shaped and disposed to communicate with the power fluid in the accumulator space and to move a portion of the power fluid from the accumulator space when the piston means is moved in a direction generally toward the actuated position thereof, a portion of the piston means being shaped and disposed to cooperate with a portion of the actuator housing to define a biasing fluid space therebetween such that the biasing fluid in the biasing fluid space biases the piston means in a direction generally toward the actuated position thereof; and
   a valve member actuator means, having a portion thereof in communication with the accumulator space, said portion being adapted to receive a predetermined amount of power fluid, the valve member actuator means having an actuating portion thereof in communication with the valve member, the actuating portion being adapted to move the valve member between open and closed positions.

2. The valve actuator of claim 1 defined further to include: a reservoir means in communication with the accumulator space, the reservoir means being shaped to retain a predetermined amount of power fluid.

3. The valve actuator of claim 2 defined further to include:
   a pump means in communication with a portion of the power fluid in the reservoir means, said pump means being adapted to pump a portion of the power fluid from the reservoir means into the accumulator space when the pump means is actuated; and
   means to actuate the pump means.

4. The valve actuator of claim 3 wherein the means to actuate the pump means is defined further to include:
   pressure switch means connected to the pump means, the pressure switch means being adapted to sense the pressure level of the power fluid generally between the reservoir means and the accumulator means and to actuate the pump means when the sensed pressure level of the power fluid reaches a predetermined level.

5. The valve actuator of claim 4 defined further to include:
   a control valve means interposed between the accumulator means and the valve member actuator means, the control valve means being adapted to control the flow of power fluid from the accumulator space to the valve member actuator means and to cooperate with the valve member actuator means such that in the opening position of the control valve means the valve member actuator means opens the valve member and in the closing position of the control valve means the valve member actuator closes the valve member; and means to actuate the control valve means to the opening position and the closing position.

6. The valve actuator of claim 1 defined further to include: a control valve means interposed between the accumulator space and the valve member actuator means, the control valve means being adapted to control the flow of fluid to the valve member actuator means.

7. The valve actuator of claim 1 wherein the portion of the piston means in communication with the guide member means is defined further as having a hollow portion formed therein intersecting one end thereof, thereby forming an open end therein, the open end and the hollow portion being sized to slidingly receive a portion of the guide member means, the end of the piston means opposite the open end thereof being adapted to sealingly provide a closed end in the piston means, the closed end of the piston means being shaped and disposed to cooperate with the guide member means to define the accumulator space therebetween.

8. The valve actuator of claim 7 wherein the guide member means includes, an outer surface sized to slidingly extend a distance into the hollow portion of the piston means, and an end portion sized and disposed to cooperate with the piston means to define the accumulator space therebetween.

9. The valve actuator of claim 8 wherein the hollow portion of the piston means is further defined as being generally cylindrically shaped.

10. The valve actuator of claim 8 wherein the sealingly closed end of the piston means is further defined as being sized and disposed to contact a portion of the power fluid in the accumulator space, such that the piston means moves a portion of the power fluid in the accumulator space when the piston means is moved generally toward the actuated position thereof.

11. The valve actuator of claim 1 wherein the valve member actuator means is further defined to include:
   a valve member actuator housing having a pair of chambers formed therein, each chamber having opposite ends and each chamber being in communication with the accumulator space and adapted to receive a predetermined amount of power fluid therefrom; and
   a piston disposed in each chamber of the valve member actuator housing, each piston being sized to slidingly move in one of the chambers generally between the ends thereof, each piston being in communication with the valve member such that the valve member is moved between open and closed positions in response to the sliding movement of the pistons.

12. The valve actuator of claim 11 wherein the valve member actuator is further defined to include: a stem actuator having opposite ends, one end of the stem actuator being shaped and disposed to communicate with the valve member to open and close the valve member, the stem actuator being disposed in the valve member actuator housing generally between the pistons therein, the stem actuator having a portion thereof shaped to engagingly contact a portion of each piston, such that the stem actuator is moved in response to the movement of the pistons, the stem actuator thereby cooperating with the pistons such that the stem actuator opens and closes the valve member in response to the movement of the pistons in the respective chambers of the valve member actuator housing.

13. The valve actuator of claim 11 defined further to include: a control valve means interposed between the chambers of the valve member actuator housing and the accumulator space, the control valve means being adapted to direct the power fluid from the accumulator space to each chamber of the valve member actuator housing to operate the valve member in response thereto.

14. The valve actuator of claim 1 wherein the valve member actuator means is defined further to include:
   a valve member actuator housing, a portion thereof being secured to the actuator housing; and
   a stem actuator means having opposite ends, one end of the stem actuator means being shaped and disposed to communicate with the valve member to open and close the valve member.

15. The valve actuator of claim 14 wherein the guide member means is defined further as being formed on a portion of the valve member actuator housing, and includes a portion thereof sized and shaped to receive a portion of the stem actuator means.

16. The valve actuator of claim 15 wherein the stem actuator means is defined further as having the end thereof, opposite the end adapted to communicate with the valve member shaped, disposed and adapted such that the stem actuator means can be manually operated to move the valve member.

17. The valve actuator of claim 15 defined further to include:
   a reservoir means adapted to retain a predetermined amount of power fluid in communication with the accumulator space; and wherein the actuating stem means includes:
   an aperture extending therethrough having opposite ends, one end of the aperture being in communication with the accumulator space and the other end thereof being in communication with the power fluid in the reservoir means.

18. A valve member actuator operated by a power supply and utilizing a power fluid and a biasing fluid for opening and closing a valve member of a valve assembly, comprising:
   a hollow housing:
   a piston reciprocally disposed in the housing dividing the housing into accumulator space for receiving the power fluid and a biasing fluid space for receiving the biasing fluid in such a manner that the biasing fluid urges the piston in a direction to retain the power fluid under pressure;
   a hydraulically actuated valve member actuator assembly connected to the valve member for moving the valve member to an open position when power fluid is supplied thereto in one direction and for moving the valve member to a closed position when power fluid is supplied thereto in an opposite direction;
   a four-way control valve connected to the power supply having an inlet connected to the accumulator space and a pair of outlets connected to the valve member actuator, said control valve having a valve member controlled by the power supply for placing said inlet in communication with one of said outlets and biased to place said inlet in communication with the other of said outlets when power is not supplied thereto from the power supply, such that power fluid will be supplied to the valve member actuator from the accumulator space in a predetermined direction in the event of a power failure; and
   pump means actuated by the power supply connected to pump a predetermined amount of power fluid into the accumulator space when the pressure in the accumulator space reaches a predetermined low level for replenishing the supply of power fluid for operation of the valve member actuator when power is available from the power supply for a normal operation of the actuator.

19. A valve member actuator operated by a power supply and utilizing a power fluid for opening or closing a valve member of a valve assembly, comprising:
   a reservoir means adapted to retain a predetermined amount of power fluid;
   an accumulator means in communication with the reservoir means, the accumulator means being adapted to receive and retain a predetermined amount of power fluid from the reservoir means;

pump means in communication with a portion of the power fluid in the reservoir means and being adapted to pump a portion of the power fluid from the reservoir means into the accumulator means when the pump means is actuated;

pressure switch means connecting the pump means to the power supply, the pressure switch means being adapted to sense the pressure level of the power fluid generally between the reservoir means and the accumulator means and to actuate the pump means when the sensed pressure level of the power fluid reaches a predetermined level;

valve member actuator means having a portion thereof in communication with the accumulator means, said portion being adapted to receive a predetermined amount of the power fluid, the valve member actuator means having an actuating portion in communication with the valve member, the actuating portion being adapted to move the valve member between open or closed positions;

a control valve means connected to the power supply and adapted to be moved in one direction between opening and closing positions by the power supply and automatically move in the opposite direction when not actuated by the power supply, said control valve means being interposed between the accumulator means and the valve member actuator means to control the flow of power fluid from the accumulator space to the valve member actuator means and to cooperate with the valve member actuator means such that in the opening position of the control valve means the valve member actuator means opens the valve member and in the closing position of the control valve means the valve member actuator closes the valve member; and accumulator actuating means in communication with a portion of the power fluid in the accumulator means and being adapted to move a portion of the power fluid from the accumulator means through the control valve means to the valve member actuator means when the control valve means is moved to an open or closed position, such that upon failure of the power supply, a portion of the power fluid is moved by the accumulator actuating means to the valve member actuating means, thereby moving the valve member to a predetermined position unless the valve member is in such predetermined position upon failure of the power supply.

20. A valve actuator utilizing a power fluid for opening and closing a valve member of a valve assembly, comprising:

an actuator housing;

an accumulator assembly supported by the actuator housing, comprising:

a guide member means disposed in the actuator housing; and a piston means, having a portion thereof in communication with the guide member means such that the piston means can be moved from an actuated to a non-actuated position, a portion of the piston means being shaped to cooperate with a portion of the guide member means to define an accumulator space therebetween, the piston means being shaped such that when the piston means is disposed in the non-actuated position, the accumulator space retains a predetermined amount of power fluid, a portion of the piston means being shaped and disposed to communicate with the power fluid in the accumulator space and to move a portion of the power fluid from the accumulator space when the piston means is moved in a direction generally toward the actuated position thereof;

biasing means disposed in a portion of the actuator housing, the biasing means being shaped and adapted to bias the piston means in a direction generally toward the actuated position thereof; and a valve member actuator means, having a portion thereof in communication with the accumulator space, said portion being adapted to receive a predetermined amount of power fluid, the valve member actuator means having an actuating portion thereof in communication with the valve member, the actuating portion being adapted to move the valve member between open and closed positions.

* * * * *